(12) United States Patent
Kusaka et al.

(10) Patent No.: US 7,569,817 B2
(45) Date of Patent: Aug. 4, 2009

(54) SCANNING PROBE APPARATUS

(75) Inventors: Takao Kusaka, Yokohama (JP); Nobuki Yoshimatsu, Kawasaki (JP); Susumu Yasuda, Tsukuba (JP); Junichi Seki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 11/612,104

(22) Filed: Dec. 18, 2006

(65) Prior Publication Data
US 2007/0158559 A1    Jul. 12, 2007

(30) Foreign Application Priority Data
Dec. 22, 2005    (JP) .............................. 2005-370095

(51) Int. Cl.
- *H01J 37/20* (2006.01)
- *G12B 21/24* (2006.01)
- *G01N 13/10* (2006.01)

(52) U.S. Cl. ................. 250/306; 250/307; 250/309; 250/442.11; 73/105; 977/849; 977/850; 977/851

(58) Field of Classification Search ................. 250/306, 250/307, 310, 423 F, 440.11, 442.11; 310/311, 310/316.01, 323.06, 338; 73/104, 105; 369/126; 977/849–851, 860–868
See application file for complete search history.

(56) References Cited

U.S. PATENT DOCUMENTS

| | | | |
|---|---|---|---|
| 5,289,004 A * | 2/1994 | Okada et al. .................. 850/1 |
| 5,751,684 A | 5/1998 | Takeda et al. | |
| 5,753,911 A | 5/1998 | Yasuda et al. | |
| 6,127,682 A * | 10/2000 | Nakamoto .................. 250/306 |
| 6,195,313 B1 | 2/2001 | Seki et al. | |
| 6,295,866 B1 * | 10/2001 | Yamamoto et al. ............ 73/105 |
| 6,323,483 B1 | 11/2001 | Cleveland et al. | |
| 6,459,088 B1 * | 10/2002 | Yasuda et al. .......... 250/442.11 |
| 2003/0062463 A1 * | 4/2003 | Narita et al. ............. 250/201.3 |
| 2007/0144243 A1 * | 6/2007 | Yoshimatsu et al. .......... 73/105 |
| 2007/0158559 A1 * | 7/2007 | Kusaka et al. ................ 250/309 |
| 2007/0187593 A1 * | 8/2007 | Yasuda et al. ................ 250/306 |
| 2007/0187594 A1 * | 8/2007 | Kusaka et al. ................ 250/306 |
| 2007/0267580 A1 * | 11/2007 | Yasuda et al. .......... 250/442.11 |

FOREIGN PATENT DOCUMENTS

| | | |
|---|---|---|
| JP | 2000-088983 | 3/2000 |
| JP | 2002-082036 | 3/2002 |
| JP | 2003-140053 | 5/2003 |
| JP | 2003-315239 | 11/2003 |
| JP | 2004-333350 | 11/2004 |
| JP | 2005-233669 | 9/2005 |
| WO | WO 97/34122 | 9/1997 |

* cited by examiner

*Primary Examiner*—Bernard E Souw
(74) *Attorney, Agent, or Firm*—Fitzpatrick, Cella, Harper & Scinto

(57) ABSTRACT

In a scanning probe apparatus capable of always effectively canceling an inertial force to suppress vibration even in repetitive use while replacing a sample holding table or a probe, a stage for a sample or the probe includes a drive element for moving the sample holding table and movable portions movable in a direction in which an inertial force generated during movement of the sample holding table. The stage is configured so that the drive element, the movable portions, and the sample holding table or the probe are integrally detachably mountable to a main assembly of the scanning probe apparatus.

8 Claims, 6 Drawing Sheets

(a)

(b)

(c)

SCANNING PROBE APPARATUS

FIELD OF THE INVENTION AND RELATED ART

The present invention relates to a scanning probe apparatus for obtaining information of a sample or effecting processing of the sample or information recording by ordinarily utilizing a scanning probe microscope (SPM), and a drive stage for the scanning probe apparatus.

Japanese Laid-Open Patent Application (JP-A) No. 2002-082036 has disclosed a scanning mechanism for an SPM capable of suppressing an occurrence of a vibration caused by a scanning operation to permit high-accuracy position control at high speed.

More specifically, as shown in FIG. 7, a scanning mechanism 200 includes bases 201 and 202 for drive elements (actuators), drive element holding member 206 and 207 provided on the bases, a drive element 203 held by these holding members and capable of expanding and contracting in Y direction, a drive element 204 fixed at one end of the drive element 203 and capable of expanding and contracting in X direction, a drive element 205 fixed at one end of the drive element 204 and capable of expanding and contracting in Z direction, and a sample stage 208 provided on one end of the drive element 205. The drive element 205 is connected to the drive element 204 in its center or the neighborhood of the center. The drive element 204 is connected to the drive element 203 in its center or the neighborhood of the center. The drive element 203 is held by the holding members 206 and 207 in its center or the neighborhood of the center.

JP-A No. 2000-088983 has disclosed an SPM which includes a small-size and lightweight drive stage causing less occurrence of vibration even when driven at high speed and is capable of obtaining a clear image at high speed.

More specifically, FIG. 8 shows a drive stage including a supporting member, two or more movable portions 505 and 515 supported by the supporting member, and two drive elements 500 and 510 for driving the two or more movable portions. This drive stage is constituted so that the movable portions 505 and 515 are driven in a direction in which inertial forces generated in the movable portions are mutually canceled during the drive of the drive elements. In this case, each drive element itself is moved in three directions of X, Y and Z, so that the movable portions and the drive elements can also be inclusively referred to as movable portions.

In the SPM, a size of the apparatus varies depending on a size of a sample to be observed or information to be observed. More specifically, a small drive stage can be used in a narrow field for view (scanning range) of a small sample to be observed and a large drive stage can be used in a wide scanning range.

In the case of using an atomic force microscope (AFM) as the SPM, the same probe can be used in common, so that a scanning stage is removed from a main assembly of the SPM and another scanning stage is mounted to the SPM main assembly. Thus, only the scanning stage is replaced in some cases.

As described above, in the case of the scanning stage including the movable portions (counterweights) capable of canceling the inertial forces, when only the scanning stage is replaced, a balance with the counterweight cannot be retained. As a result, expected cancellation of inertial forces cannot be effected in some cases.

Particularly, in the case where an electromechanical transducer such as a piezoelectric element is used as a drive element (actuator) for the scanning stage or the counterweight, an operation performance of the drive element is changed with use. Accordingly, when the SPM is continuously used after only the scanning stage is replaced, deterioration of the drive element for the counterweight progresses and on the other hand, the scanning stage is refreshed by the replacement. As a result, an amount of displacement is different between the drive element for the counterweight and the drive element for the scanning stage, so that it is more difficult to cancel inertial forces generated in the scanning stage.

It has been clarified that this difficulty is also true for the case where a probe and a drive element for effecting scanning thereof are replaced in an SPM of the type wherein a sample is fixed and the probe is subjected to the scanning.

SUMMARY OF THE INVENTION

A principal object of the present invention is to provide a scanning probe apparatus capable of always effectively canceling an inertial force to suppress vibration even when the scanning probe apparatus is repetitively used while replacing a sample holding table or a probe.

According to an aspect of the present invention, there is provided a scanning probe apparatus for obtaining information of a sample or processing the sample with relative movement between the sample and the apparatus, the apparatus comprising:

a probe; and a sample stage for holding the sample, wherein the sample stage comprises a sample holding table, a drive element for moving the sample holding table, and a movable portion movable in a direction in which an inertial force generated during movement of the sample holding table is canceled, and wherein the sample stage is detachably mountable, integrally with the sample holding table, the drive element, and the movable portion, to a main assembly of the apparatus.

According to another aspect of the present invention, there is provided a scanning probe apparatus for obtaining information of a sample or processing the sample with relative movement between the sample and the apparatus, the apparatus comprising:

a probe; and a sample stage for holding the sample, wherein the probe is provided on a drive stage comprising a probe table for holding the probe, a drive element for moving the probe, and a movable portion movable in a direction in which an inertial force generated during movement of the sample holding table is canceled, and wherein the drive stage is detachably mountable, integrally with the probe table, the drive element, and the movable portion, to a main assembly of the apparatus.

According to an embodiment of the present invention, it is possible to always effectively canceling an inertial force to suppress vibration even when the scanning probe apparatus is repetitively used while replacing the sample holding table or the probe.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 2:
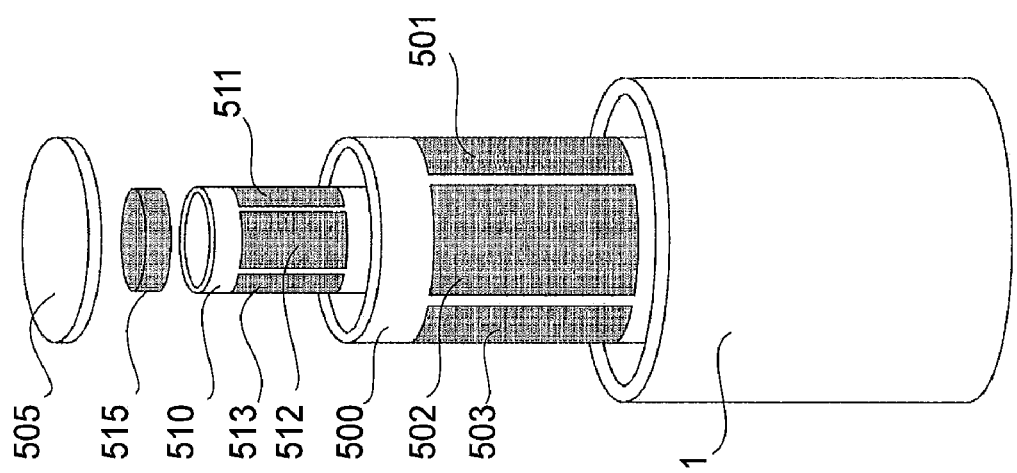
FIG. 2 is a schematic view for illustrating a structure of the scanning stage in Embodiment 1.

In the present invention, as the scanning probe apparatus, it is possible to use a scanning probe microscope (SPM).

The SPM is a scanning microscope for obtaining information of a surface of a sample or processing the sample by effecting scanning with a probe or the sample and is a general name of microscopes including scanning tunneling microscope (STM), atomic force microscope (AFM), (scanning) magnetic force microscope (MFM), scanning capacitance microscope (SCaM), scanning near-field optical microscope (SNOM), and scanning thermal microscope (SThM).

The scanning probe microscope (SPM) is capable of effecting raster scanning of a probe and a sample relative to each other in XY directions to obtain surface information in a desired sample region through the probe, thus displaying the surface information on a TV monitor in a mapping mode. Further, the SNOM or the like is capable of effecting fine processing by the action of light emitted from a tip of the probe onto a member to be processed or capable of effecting information recording with light. Further, it is also possible to effect fine processing or information recording, such as formation of projections and recesses at a sample surface.

In such an SPM, a scanning mechanism for effecting motion in Z direction by performing feedback control so that an interaction between the sample and probe is constant also in Z direction during XY scanning. The motion in Z direction is, different from regular movement in XY directions, an irregular motion since it reflects a sample shape or sample state of the sample, but is generally referred to as a scanning operation in Z direction. The Z direction scanning is a motion at a highest frequency among the scannings in XYZ directions. More specifically, the SPM has a scanning frequency of from about 0.05 Hz to about 200 Hz in X direction. A Y direction scanning frequency is about 1/(number of Y direction scanning lines). The number of Y direction scanning lines is 10-1000 lines. Further, a Z direction scanning frequency is from about (X direction scanning frequency)×(number of pixels per one scanning line in X direction) to about 100×(X direction scanning frequency)×(number of pixels per one scanning line in X direction).

For example, when an image of 100 pixels in X direction and 100 pixels in Y direction is acquired in 1 sec., the X direction scanning frequency is 100 Hz, the Y direction scanning frequency is 1 Hz, and the Z direction scanning frequency is 10 kHz or more. Incidentally, this Z direction scanning frequency is a currently highest scanning frequency. Most of SPMs remain at an X direction scanning frequency of about several Hz. In order to realize the above described higher frequencies, a scanning mechanism therefor is required to be not only stable against external vibration but also suppressed in vibration generated by the scanning mechanism itself during an inner scanning operation.

According to an embodiment of the present invention, in a scanning probe apparatus which includes a probe and a sample stage for holding a sample and obtains information of a sample with relative movement between the sample and the apparatus or processes the sample with relative movement between the sample and the apparatus, (1) the sample stage is characterized in that it comprises a sample holding table, a drive element for moving the sample holding table, and a movable portion movable in a direction in which an inertial force generated during movement of the sample holding table is canceled, and that the sample stage is detachably mountable, integrally with the sample holding table, the drive element, and the movable portion, to a main assembly of the apparatus, or (2) the probe is characterized in that, it is provided on a driver stage comprising a probe table for holding the probe, a drive element for moving the probe, and a movable portion movable in a direction in which an inertial force generated during movement of the sample holding table is canceled, and the drive stage is detachably mountable, integrally with the probe table, the drive element, and the movable portion, to a main assembly of the apparatus.

Further, the scanning probe apparatus may also include both of the above described features (1) and (2).

The probe usable in the present invention may be formed of silicon, silicon nitride, tungsten, cobalt, carbon fiber, etc. A shape and material for the probe may be appropriately selected depending on uses of the SPM.

The probe is provided to a cantilever of silicon or another metal and a surface of the cantilever may be coated with metal such as aluminum or platinum.

The drive element usable in the present invention may preferably be an electromechanical transducer such as a piezoelectric element. The piezoelectric element may have a cylindrical shape or a lamination shape.

The movable portion usable in the present invention may be a counterweight itself, a combination of the counterweight and the drive element such as the electromechanical transducer for driving the counterweight or may also be an electromechanical transducer also having the function as the counterweight.

The sample holding table usable in the present invention may be a member on which the sample is mounted or a member provided with an adsorption means for fixing the sample so that the sample is not moved on the sample holding table.

Further, in the present invention, it is preferable that an electric connector of the scanning stage and an electric connector of the apparatus main assembly are connected together with mounting of the scanning stage and disconnected together with demounting of the scanning stage.

Embodiment 1

Figure 1:
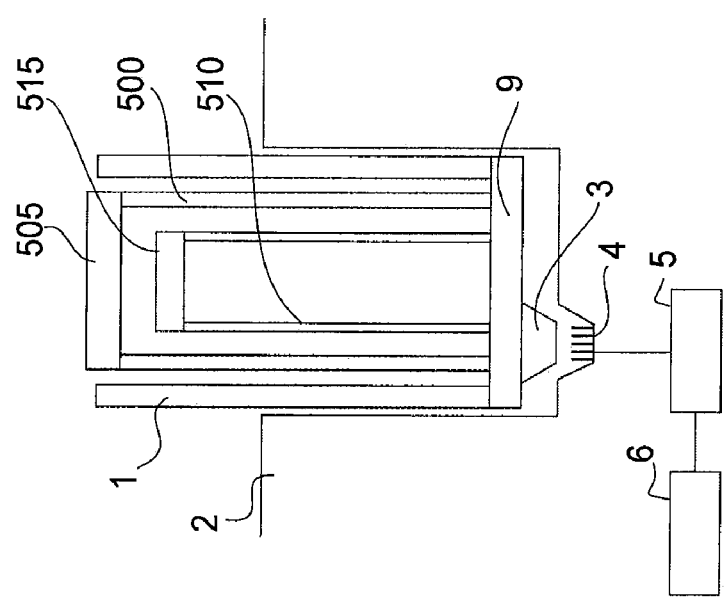
FIG. 1 is a schematic sectional view for illustrating constitution of a scanning stage in Embodiment 1 of the present invention.

FIG. 1 is a schematic sectional view of a scanning stage used in an SPM and FIG. 2 is a schematic view for illustrating a structure of the scanning stage.

The scanning stage includes, e.g., an outer housing 1 formed of metal, as desired, and is replaceably mounted and engaged in a recess portion 2 of a main assembly of the SPM. Further, as needed, the apparatus main assembly and the scanning stage may also be fixed with a screw. Outside a bottom supporting member 9 of the scanning stage, an electric connector 3 is provided. At a bottom of the recess portion 2, an electric connector 4 is provided. These electric connectors 3 and 4 are connected when a scanner is engaged in the recess portion 2 to be mounted to the apparatus main assembly and are externally supplied through a drive circuit 5 with signals for driving a scanner drive element 500, as a drive element for a sample holding table, and a counter drive element 510.

The scanner drive element 500 is a cylindrical piezoelectric element and a circular plate-like sample holding table 505 is provided at an upper (top) portion of the drive element 500. On the other hand, the counter drive element 510 is a cylindrical piezoelectric element having a smaller diameter than the scanner drive element 500 and a counterweight 515 is provided at an upper portion of the drive element 510.

Based on X drive signal, Y drive signal, and Z drive signal outputted from a control circuit 6 of the apparatus main assembly, the signals are appropriately converted into voltage signals suitable for driving the piezoelectric elements and applied to the scanner drive element 500 and the counter drive element 510.

The respective piezoelectric elements (drive elements) are driven in a manner as described in JP-A No. 2000-088983.

As shown in FIG. 2, the scanning stage includes two drive stages consisting of two cylindrical piezoelectric. elements concentrically disposed. More specifically, inside a first cylindrical piezoelectric element 500, a second cylindrical piezoelectric element 510 is concentrically disposed. This state is shown in FIG. 2 as an exploded view. Around the first cylindrical piezoelectric element 500, divided four electrodes 501 to 504 are disposed (in FIG. 2, the electrode 504 is not shown since it is located on a backside), and at an upper portion of the first cylindrical piezoelectric element 500, a sample holding table 505 is connected. Further, around the second cylindrical piezoelectric element 510, divided four electrodes 511 to 514 are disposed (in FIG. 2, the electrode 514 is not shown), and at an upper portion of the second cylindrical piezoelectric element 510, a counterweight 515 is connected. The first and second cylindrical piezoelectric elements 500 and 510 can be bent by controlling voltages applied to opposite two electrodes (501 and 503, 502 and 504, 511 and 513, or 512 and 514) so that one of the two electrodes is expanded and the other electrode is contracted. Further, it is also possible to expand and contrast each of the cylindrical piezoelectric elements in a long axis direction by applying the same voltage to the divided four electrodes. In short, the bending and the expansion and contraction of the cylindrical piezoelectric elements 500 and 510 can be controlled by voltages.

Here, as a modified embodiment, the electrodes 501 to 504 may also be used for scanning in XY directions and another piezoelectric element may be provided for scanning in Z direction. The Z direction scanning piezoelectric element may, e.g., be provided above the electrodes 501 to 504.

Therefore, it is possible to three-dimensionally drive the sample holding table (movable table) 505 and the counterweight 515 disposed at the upper (top) portions of the cylindrical piezoelectric elements.

Figure 3:
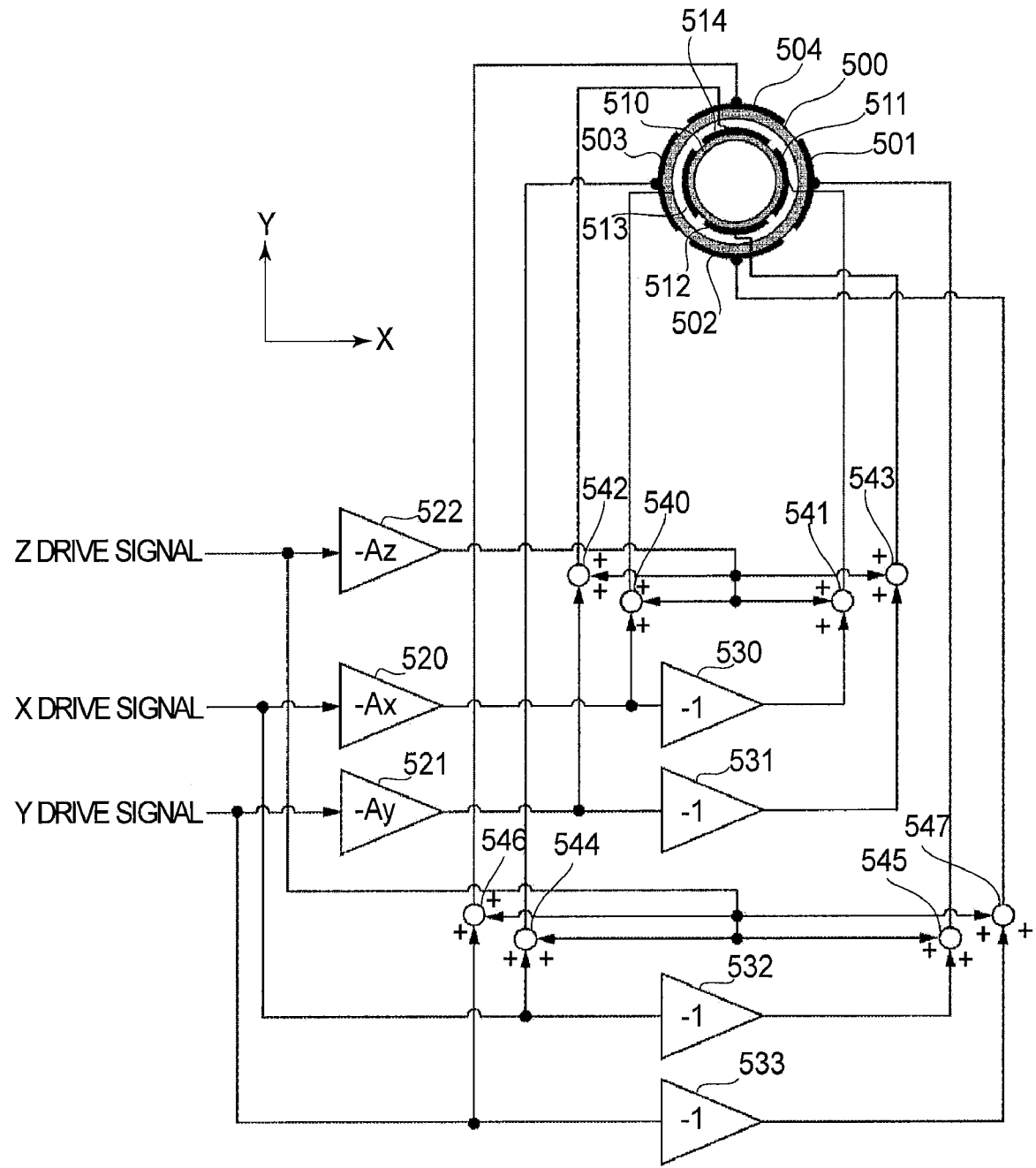
FIG. 3 is a schematic view for illustrating a driving method of the scanning stage in Embodiment 1.
Figure 4:
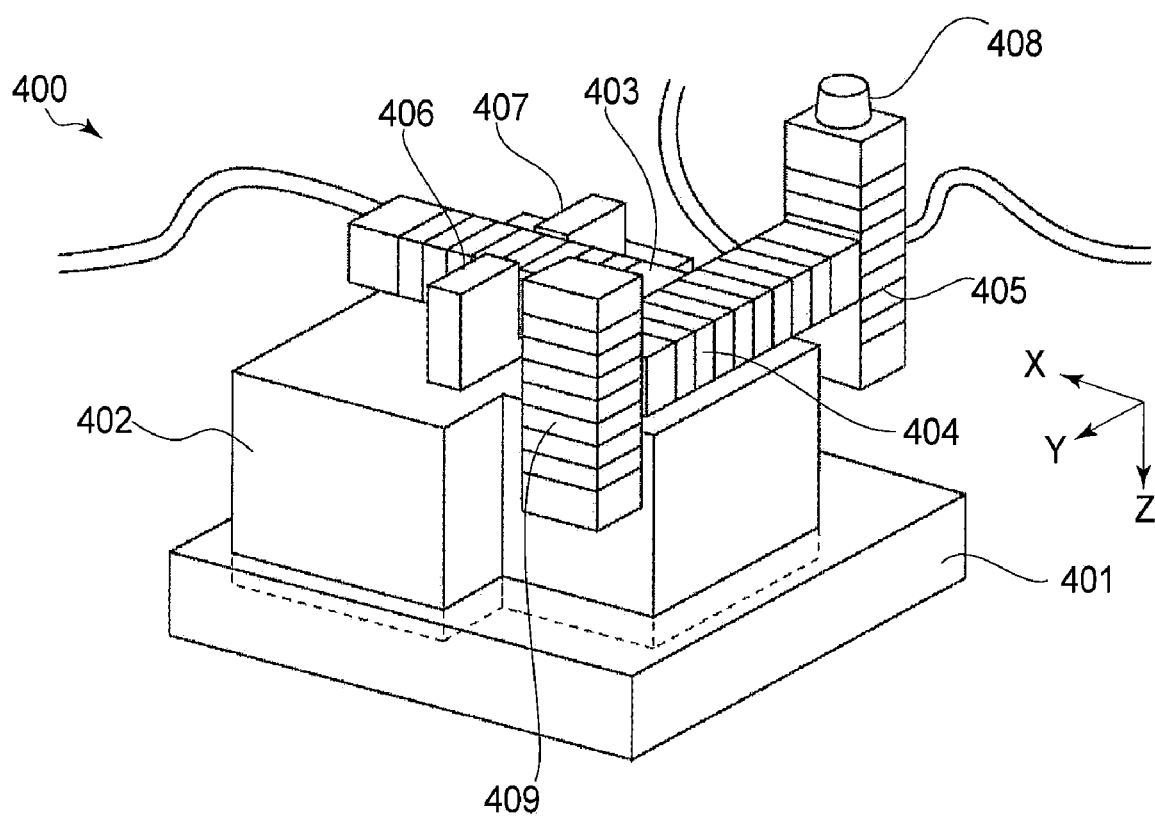
FIG. 4 is a schematic perspective view for illustrating constitution of a scanning stage in Embodiment 2.
Figure 5:
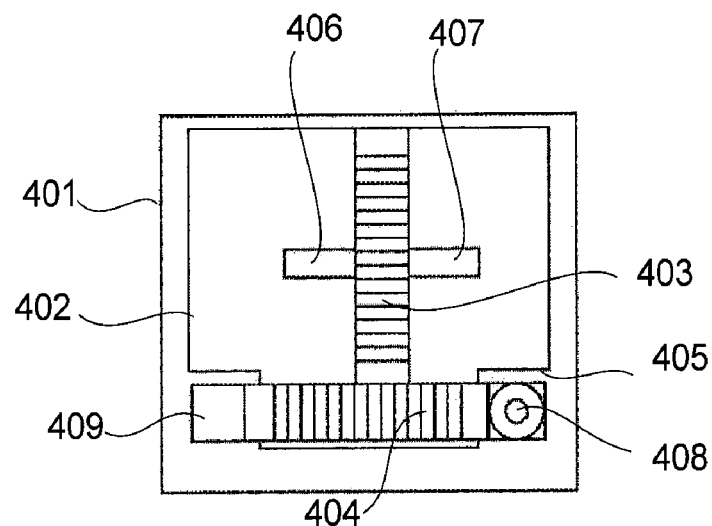
FIGS. 5(a) to 5(c) are schematic views for illustrating the constitution of the scanning stage in Embodiment 2.
Figure 5:
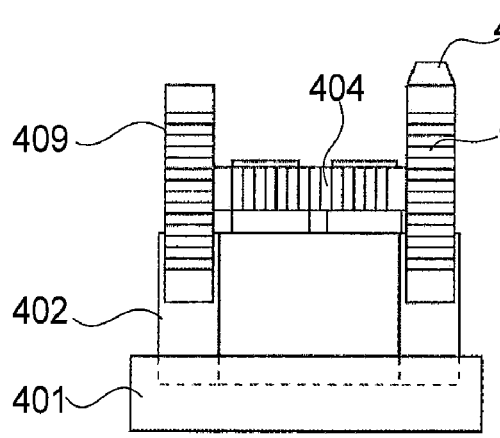
Figure 5:
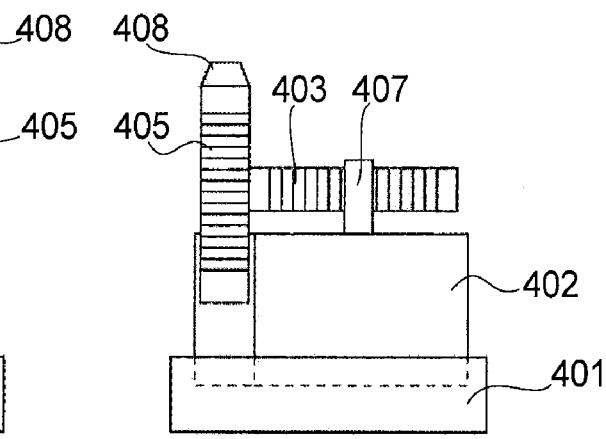

FIG. 3 is a wiring diagram for the scanning stage in this embodiment.

Figure 8:
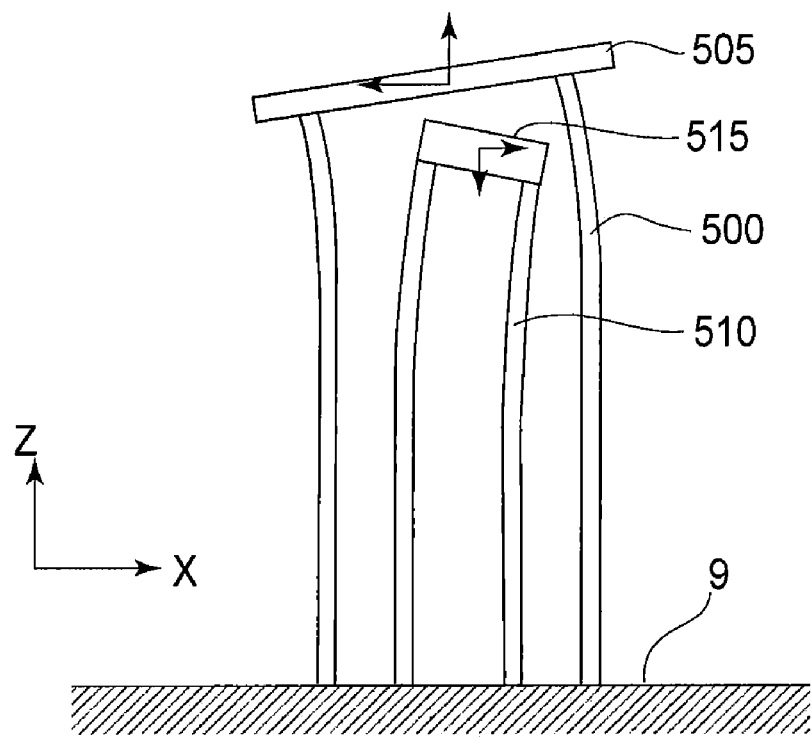
FIG. 8 is a schematic sectional view for illustrating an operation of a conventional scanning stage.

By effecting wiring as shown in FIG. 3, the outer cylindrical piezoelectric element 500 and the inner cylindrical piezoelectric element 510 are always driven in mutually opposite directions. A behavior of deformation of the cylindrical piezoelectric elements is the same as in JP-A No. 2000-088983. Similarly, as in the case of FIG. 8, the cylindrical piezoelectric element 500 is bent and expanded toward an upper left direction, the cylindrical piezoelectric element 510 is bent and contracted toward a lower right direction. Gains -Ax, -Ay, and -Az of amplifiers 520, 521 and 522 are set to cancel inertial forces with respect to the cylindrical piezoelectric elements 500 and 510 in X, Y and Z directions, respectively. Further, these gains may desirably be adjusted to optimum values when a weight of an object to be placed on a moving table.

In this embodiment constituted as described above, the drive stage is always driven so that inertial forces generated with respect to the outer first cylindrical piezoelectric element 500 and the inner second cylindrical piezoelectric element 510 are canceled. As a result, movement of the center of gravity of the drive stage can be suppressed so that it is zero or a negligible level. Accordingly, it is possible to provide a scanning stage causing less vibration even when the sample holding table is driven at high speed.

In this embodiment, not only the scanning piezoelectric element but also the inertial force canceling piezoelectric element are replaceable. More specifically, these piezoelectric elements are fixed on the bottom supporting member 9 and the bottom supporting member 9 is detachably mountable to the apparatus main assembly. As a result, both the scanning piezoelectric element and the inertial force canceling piezoelectric element are integrally replaceable.

Thus, even when the SPM is repetitively used with replacement of the sample holding table, it is possible to always cancel the inertial forces thereby to suppress vibration.

Further, when the scanning stage is provided with a cantilever and a probe in place of the sample holding table 505, it is possible to provide a scanning stage for the probe.

Embodiment 2

Embodiment 2 of the present invention will be described with reference to FIGS. 4 and 5(a) to 5(c).

Referring to these figures, a scanning stage 400 includes a scanning stage holding table 401 on a main assembly side of an SPM and a drive element supporting member 402 replaceably fixed on the scanning stage holding table 401. On the drive element supporting member 402, drive element holding members 406 and 407 are provided so as to hold a drive element 403. At one end of the drive element 403, a drive element 404 is fixed. At one end of the drive element 404, a drive element 505 is fixed. At the other end of the drive element 404, a counterweight member 409 is fixed. At one end of the drive element 405, a sample holding table 408 is provided.

The drive elements 403, 404 and 405 are laminated piezoelectric elements. Further, the counterweight member 409 is also a laminated piezoelectric element. The drive element 405 is capable of expanding and contracting in Z direction (first direction) and is connected to one end of the drive element 404 in its center or the neighborhood of the center. The counterweight member 409 has the same weight as the drive element 405 and is connected to the other end of the drive element 404 in its center or the neighborhood of the center.

The drive element 404 is capable of expanding and contracting in Y direction (second direction) and is connected to one end of the drive element 403 in its center or the neighborhood of the center. The drive element 403 is capable of expanding and contracting in X direction (third direction) and is held by the drive element holding members 406 and 407 in its center or the neighborhood of the center.

As described above, the supporting member 402 is engaged in the recess portion of the scanning stage holding table 401 to be detachably fixed with a screw. As a result, the sample holding table 408 is integrally replaceable together with the counterweight member 409 with respect to the scanning stage holding table 401.

In this embodiment, replaceable members are not limited to the scanning piezoelectric element (drive element) 405 and the sample holding table 408. The scanning drive element 405 and the inertial force canceling drive element 409 are fixed to the supporting member 402, and the supporting member 402 is configured to be detachably mountable to the scanning stage holding table 401 on the apparatus main assembly side. As a result, both the piezoelectric elements (drive elements) are integrally replaceable.

In this embodiment, it is also preferable that a counterweight having the same weight as the sample holding table 408 is provided at a lower portion of the drive element 405 in Z direction and is moved in a direction opposite to a movement direction of the sample holding table 408. As a result, movement of the center of gravity in Z direction can be suppressed to prevent vibration in Z direction. In this case, symmetry with respect to movement direction (direction of motion) is further increased, so that it is possible to provide the counterweight in all the X, Y and Z directions.

Further, it is also preferable that a counterweight having the same weight as a total of weights of the sample holding table 408, the drive element 405, the drive element 404, and the counterweight member 409 is provided at an end of the drive element 403, opposite to the end at which the drive element 403 and the drive element 404 are connected, and is moved in a direction opposite to the movement direction of the sample holding table 408 in X direction. As a result, movement of the center of gravity in X direction can be suppressed to prevent vibration in X direction.

As described above, according to this embodiment, even when the SPM is repetitively used with replacement of the sample holding table, it is possible to always effectively cause the inertial forces to suppress vibration.

Further, by providing a cantilever and a probe in place of the sample holding table 408, it is possible to provide a scanning stage for the probe.

Embodiment 3

Figure 6:
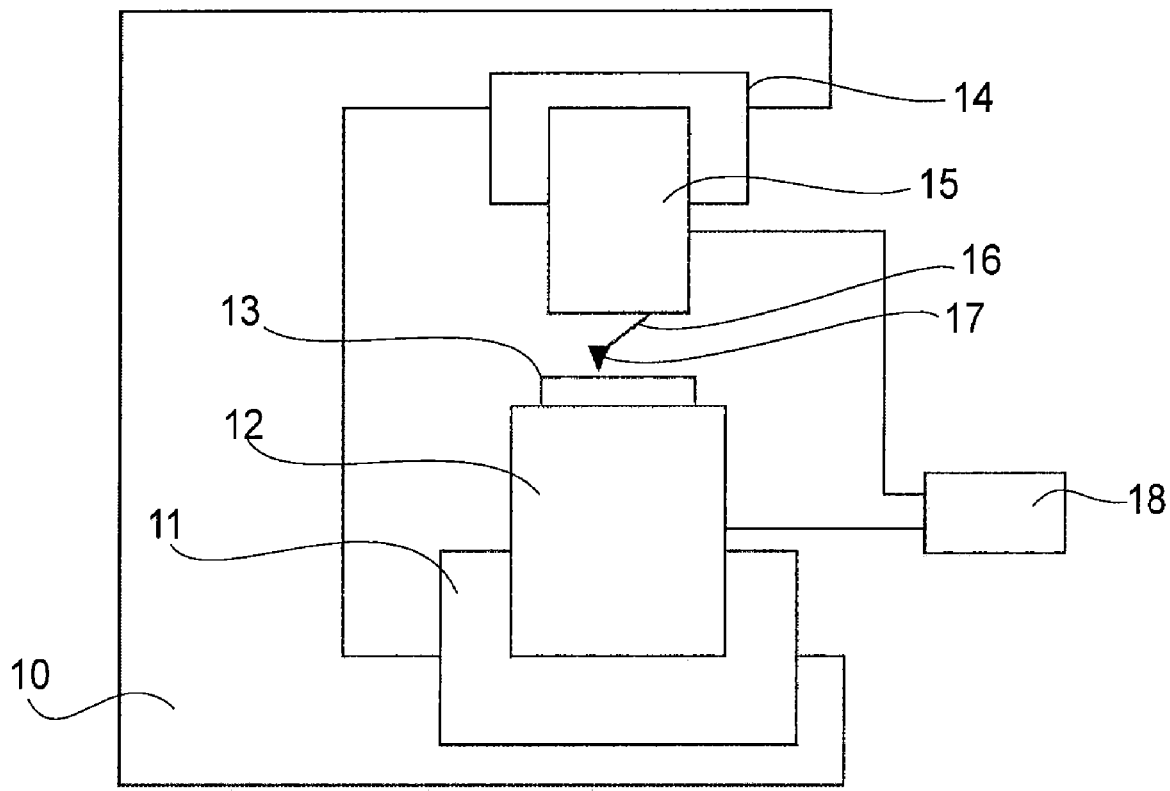
FIG. 6 is a schematic view for illustrating a scanning probe apparatus according to Embodiment 3 of the present invention.
Figure 7:
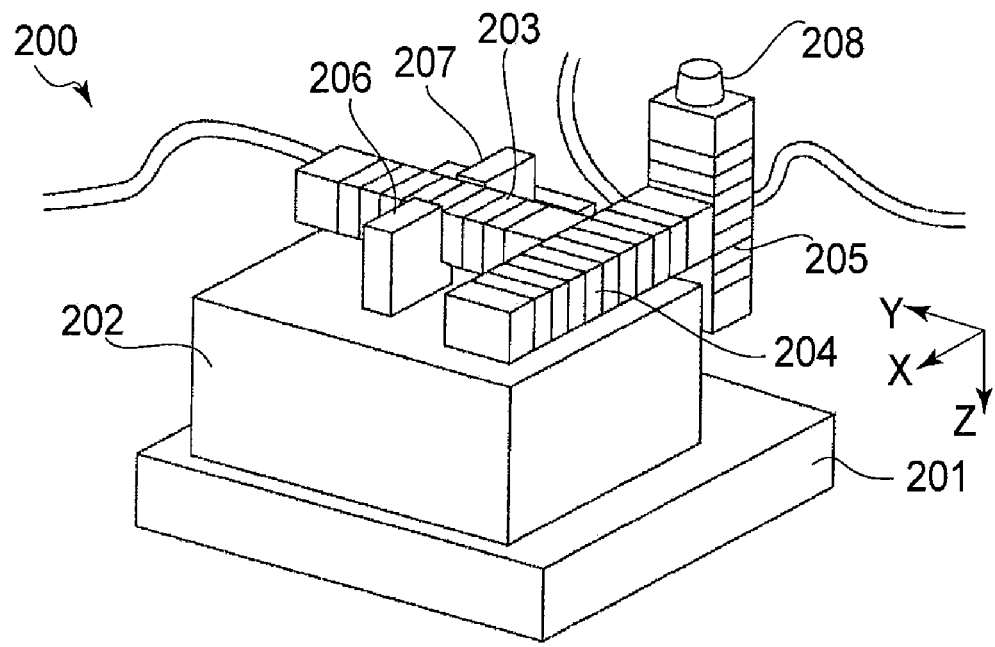
FIG. 7 is a schematic perspective view for illustrating a conventional scanning stage.

FIG. 6 shows a scanning probe apparatus according to this embodiment of the present invention.

Referring to FIG. 6, the AFM includes a frame 10 of a main assembly of apparatus, a recess portion 11 of the apparatus main assembly, a scanning stage 12 for performing scanning of sample, a sample 13, a recess portion 14 for a drive stage of the apparatus main assembly, a drive stage 15, a cantilever 16, and a probe 17. A reference numeral 18 represents a drive control circuit including a drive circuit, a control circuit, a detection circuit, and an image processing circuit.

In this embodiment, as the scanning stage 12, it is possible to use the scanning stage in Embodiment 1 or Embodiment 2. Further, as the drive stage 15, it is possible to use the scanning stage in Embodiment 1 or Embodiment 2. Further, it is also possible to use the scanning stage in Embodiment 1 or Embodiment 2 as both of the scanning stage 21 and the drive stage 15.

In any of the above cases, when at least one of the scanning stage 12 and the drive stage 15 is replaceable, the counterweight and the drive element for driving the counterweight are configured to be integrally detachably mountable to the apparatus main assembly together with the sample holding table or the probe.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 370095/2005 filed Dec. 22, 2005, which is hereby incorporated by reference.

What is claimed is:

1. A scanning probe apparatus for obtaining information of a sample or processing the sample with relative movement between the sample and said apparatus, said apparatus comprising:
    a probe; and
    a sample stage for holding the sample,
        wherein the sample stage comprises a sample holding table, a drive element for moving the sample holding table, and a movable portion movable in a direction in which an inertial force generated during movement of the sample holding table is canceled, and wherein the sample stage is detachably mountable, integrally with the sample holding table, the drive element, and the movable portion, to a main assembly of said apparatus.

2. An apparatus according to claim 1, wherein each of the drive element and the movable portion comprises an electromechanical transducer.

3. An apparatus according to claim 2, wherein the electromechanical transducer comprises a cylindrical piezoelectric element.

4. An apparatus according to claim 1, wherein the drive element is an electromechanical transducer capable of expanding and contracting in a direction, the electromechanical transducer supporting the sample holding table at one end portion thereof and supporting the movable portion at the other end portion thereof.

5. A scanning probe apparatus for obtaining information of a sample or processing the sample with relative movement between the sample and said apparatus, said apparatus comprising:
    a probe; and
    a sample stage for holding the sample,
        wherein the probe is provided on a drive stage comprising a probe table for holding the probe, a drive element for moving the probe, and a movable portion movable in a direction in which an inertial force generated during movement of the probe table is canceled, and wherein the drive stage is detachably mountable, integrally with the probe table, the drive element, and the movable portion, to a main assembly of said apparatus.

6. An apparatus according to claim 5, wherein each of the drive element and the movable portion comprises an electromechanical transducer.

7. An apparatus according to claim 6, wherein the electromechanical transducer comprises a cylindrical piezoelectric element.

8. An apparatus according to claim 5, wherein the drive element is an electromechanical transducer capable of expanding and contracting in a direction, the electromechanical transducer supporting the probe table at one end portion thereof and supporting the movable portion at the other end portion thereof.

* * * * *